United States Patent
Oda

(10) Patent No.: US 7,829,491 B2
(45) Date of Patent: Nov. 9, 2010

(54) SILICON NITRIDE SINTERED BODY AND MANUFACTURING METHOD THEREOF, MEMBER FOR MOLTEN METAL, MEMBER FOR HOT WORKING, AND MEMBER FOR DIGGING

(75) Inventor: Takehiro Oda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 412 days.

(21) Appl. No.: 11/720,278

(22) PCT Filed: Nov. 22, 2005

(86) PCT No.: PCT/JP2005/021419

§ 371 (c)(1),
(2), (4) Date: Mar. 11, 2008

(87) PCT Pub. No.: WO2006/057232

PCT Pub. Date: Jun. 1, 2006

(65) Prior Publication Data

US 2009/0023577 A1     Jan. 22, 2009

(30) Foreign Application Priority Data

Nov. 26, 2004 (JP) .............................. 2004-342338

(51) Int. Cl.
*C04B 35/599* (2006.01)
(52) U.S. Cl. ..................... 501/98.2; 501/98.3
(58) Field of Classification Search ................ 501/98.2, 501/98.3
See application file for complete search history.

(56) References Cited

U.S. PATENT DOCUMENTS

| | | | |
|---|---|---|---|
| 5,132,257 A | 7/1992 | Kodama et al. | 501/95 |
| 5,902,761 A | 5/1999 | Oda et al. | 501/97.1 |
| 7,642,209 B2 * | 1/2010 | Okawa et al. | 501/97.1 |

FOREIGN PATENT DOCUMENTS

| | | |
|---|---|---|
| EP | 0 549 801 A1 | 7/1993 |
| JP | 63-64980 | 3/1988 |
| JP | 64028283 A | 1/1989 |
| JP | 03-208876 | 9/1991 |
| JP | 05-209276 | 8/1993 |
| JP | 07-187797 | 7/1995 |
| JP | 08-119743 | 5/1996 |
| JP | 2539960 | 7/1996 |
| JP | 2539961 | 7/1996 |
| JP | 2597774 | 1/1997 |
| JP | 09-268072 | 10/1997 |
| JP | 2776471 | 5/1998 |
| JP | 2820846 | 8/1998 |
| JP | 2000-256066 | 9/2000 |
| JP | 2000-335976 | 12/2000 |
| JP | 2001-114565 | 4/2001 |
| JP | 2002-356376 | 12/2002 |
| JP | 2007260714 | * 10/2007 |
| JP | 2008024579 | * 2/2008 |
| JP | 2008155252 | * 7/2008 |

* cited by examiner

*Primary Examiner*—Karl E Group
(74) *Attorney, Agent, or Firm*—DLA Piper LLP (US)

(57) ABSTRACT

A silicon nitride sintered body comprising β-sialon expressed by a composition formula of $Si_{6-Z}Al_ZO_ZN_{8-Z}$, wherein z value being the dissolved amount is 0.1 to 1, as a main phase, a grain boundary phase and Fe silicide particles. The grain boundary phase contains RE (Group III elements in the periodic table)-Al—Si—O, and component ratios of Al, Si and RE in terms of $Al_2O_3$, $SiO_2$, $RE_2O_3$, respectively is 5 to 50 mass % of $Al_2O_3$, 5 to 20 mass % of $SiO_2$, and the balanced amount of $RE_2O_3$, the grain boundary phase is contained in a range of 20 volume % or less to 100 volume % of the sintered body, and the Fe silicide particles is contained in 0.02 to 3 mass % in terms of Fe to 100 mass % of the sintered body. Its high thermal shock resistance provides suitable applications to members for molten metal, hot working, and digging.

13 Claims, No Drawings

SILICON NITRIDE SINTERED BODY AND MANUFACTURING METHOD THEREOF, MEMBER FOR MOLTEN METAL, MEMBER FOR HOT WORKING, AND MEMBER FOR DIGGING

TECHNICAL FIELD

The present invention relates to a silicon nitride sintered body having excellent thermal conductivity and mechanical properties at room temperature and high temperature, thereby having high thermal shock resistance, and a method of manufacturing the silicon nitride sintered body. The present invention also relates to a member for molten metal, a member for hot working, and a member for digging, each of which is composed of the silicon nitride sintered body.

BACKGROUND ART

Silicon nitride sintered bodies are raw materials having excellent thermal properties and mechanical properties, and heretofore they have been introduced in different patent publications and literatures. In particular, a large number of silicon nitride sintered bodies have been introduced which can improve mechanical properties by using sialon as a principal phase.

Patent literature 1 and 2 propose silicon nitride sintered bodies with improved mechanical properties. That is, in the ternary composition chart of $Si_3N_4$— first assistant—second assistant, the first assistant is a combination of two kinds of $Y_2O_3$ and MgO, and the crystal phase in the obtained sintered body contains both of $\alpha$-$Si_3N_4$ and $\beta'$-sialon. The $\beta'$-sialon in the sintered body is of a general formula $Si_{6-z}Al_zO_zN_{8-z}$ (where $0 \leq Z \leq 1.0$), enabling control of the crystal composition.

Patent literature 3 proposes, from the viewpoint that it is important to optimize the dissolved amount of Al and O into crystal lattices, a range required in a chart, on which the ordinate represents the weight ratio of one type or two or more types of rare earth metals and lanthanides metal oxides and one type or two or more types of aluminium oxides and aluminium nitrides, each being added as sintered additives, and the abscissa represents the ratio of a measured z value indicating the amount of substitutional solid solution of Al and O elements in $\beta'$-silicon aluminium oxynitride [$\beta'$—$Si_{6-z}Al_zO_zN_{8-z}$ ($0 \leq Z \leq 4.2$)] crystal phase that can be measured by the X-ray diffraction of a sintered body, and an ideal z value to be calculated on the assumption that all of the Al elements of one type or two types of the added aluminium oxides and aluminium nitrides have been substituted and melt in solid state in the $\beta'$-silicon aluminium oxynitride crystal phase. This patent publication describes that, in the above-mentioned range, the shape of a fibrous $Si_3N_4$ crystal grain can be controlled, enabling improvements in the strength and the toughness of a $Si_3N_4$ sintered body. There is also proposed its manufacturing method of heat treating a $Si_3N_4$ raw material powder, in which 60% or more of oxygen impurities contained in the powder obtained by imide pyrolysis are present in the surface part of the raw material powder, in an atmosphere of $N_2$ gas at 1350 to 1650° C. for two hours or more.

Patent literature 4 proposes a high toughness sialon sintered body composed of sialon particles and grain boundary phases. The total amount of the grain boundary phases is 20 wt % or less. In a three-component system of $SiO_2$—$Al_2O_3$—$Y_2O_3$ Si, Al, and Y of the grain boundary phases in terms of oxide, the ($SiO_2$, $Al_2O_3$, $Y_2O_3$) compositions in weight ratio are within an area surrounded by four points of a point A (20, 10, 70), a point B (20, 25, 65), a point C (30, 25, 55), and a point D (30, 10, 60). That is, this publication describes that the composition and the total amount of the grain boundary phases are important for high toughness.

Patent literature 5 proposes a silicon nitride composite sintered body containing Y and Al elements. That is, 0.5 to 5 volume % of different type particles, which are the oxides or the nitrides of Groups IVa and Va in the periodic table, and have a coefficient of thermal expansion of $5 \times 10^{-6}$/° C. or above and a mean particle diameter of 1 to 500 nm, are dispersed in silicon nitride and/or sialon crystal grains and grain boundary phases, which have a mean diameter of shorter axis of 0.05 to 3 μm, and an aspect ratio of 10 or less. Dispersion of the nanometer-size different types of particles causes residual stress in the crystal grains and the grain boundary phases, thereby achieving 140 kg/mm² or more in the four-point flexural strength thereof.

Patent literature 1: Japanese Patent Publications No. 2539961
Patent literature 2: Japanese Patent Publications No. 2597774
Patent literature 3: Japanese Patent Publication No. 2539960
Patent literature 4: Japanese Patent Publication No. 2820846
Patent literature 5: Japanese Patent Publication No. 2776471

DISCLOSURE OF THE INVENTION

Problems to be Solved by the Invention

However, with regard to thermal shock resistance, the above-mentioned five publications take no special account of the importance of thermal conductivity and mechanical strength at high temperature. This results in the following problems relating to the improvement in thermal shock resistance.

That is, in the patent literature 1 and 2, MgO as the first assistant has high vapor pressure and hence is susceptible to decomposition and volatilization during the time of sintering. Therefore, a surface layer part causes a strength drop due to the generation of pin holes resulting from the volatilization of the assistant compositions. In addition, the surface layer part and the internal part have different material characteristics from each other because it is difficult to achieve a sintered body having uniform internal and external components. It is also difficult to control the z value within the objective range because of different progresses in sintering. Further, the sintered body having a z value of nearly 1.0 has the problem that thermal conductivity is lowered and thermal shock resistance is deteriorated. Especially, the softening temperature of the grain boundary phase containing MgO is low, and high temperature strength is low. There is also the problem that the phonon propagation at high temperature in the grain boundary phases is poor and there is a sharp thermal conductivity drop, making it difficult to improve thermal shock resistance.

Although the patent literature 3 pay attention to the weight ratio of one type or two or more types of rare earth metals and lanthanides metal oxides, and one type or two or more types of aluminium oxide and aluminium nitride, each being added as the sintered additives, it fails to control the oxygen impurities contained in the silicon nitride powder obtained by imide pyrolysis, namely $SiO_2$ composition, so that the control of the composition of the grain boundary phases is insufficient. Thus, the grain boundary phases can be softened especially at high temperature, and high temperature thermal conductivity and high temperature strength are low due to poor phonon propagation, resulting in insufficient thermal shock resistance.

Although the patent literature 4 controls the composition of the grain boundary phases in three-component system of $SiO_2$—$Al_2O_3$—$Y_2O_3$, the $SiO_2$ composition in the grain boundary phases is 20 mass % or more and hence it is close to the lowest liquid layer generation composition in the three-component system of $SiO_2$—$Al_2O_3$—$Y_2O_3$. As the result, the softening temperature of the grain boundary phases is low, and high temperature strength and high temperature thermal conductivity are low, resulting in insufficient thermal shock resistance.

In the Patent literature 5, the mean particle size of the oxides or nitride, each being dispersed particles, of Group IVa and Va in the periodic table (TiN, $ZrO_2$, ZrN, and NbN in Examples thereof) is in the range of 1 to 500 nm, that is, extremely fine. It is therefore necessary to use an expensive raw material. In addition, the dispersibility during the time of wet mixing is poor, and an aggregation part can serve as a breaking source, so that it is susceptible to a strength drop at room temperature and high temperature, thereby serving as the originating point of occurrence of cracks due to thermal shock.

Accordingly, an advantage of the present invention is to provide a silicon nitride sintered body having excellent thermal shock resistance, and a method of manufacturing the silicon nitride sintered body, as well as a member for molten metal, a member for hot working, and a member for digging.

Means for Solving the Problems

For improving thermal shock resistance, it is important to improve not only the strength and the thermal conductivity at room temperature, but also improvements in the strength and the thermal conductivity at high temperature. To this end, it is preferable to (i) minimize a z value indicating the dissolved amount of Al, O, and N into a silicon nitride crystal, (ii) optimize the chemical composition of a grain boundary phase, especially $SiO_2$ composition, and (iii) include Fe silicide.

A silicon nitride sintered body of the present invention can be comprising β-sialon expressed by a composition formula of $Si_{6-z}Al_zO_zN_{8-z}$, wherein z value being the dissolved amount is 0.1 to 1, as a main phase, a grain boundary phase and Fe silicide particles. The grain boundary phase contains RE (Group III elements in the periodic table)-Al—Si—O, and component ratios of Al, Si and RE in terms of $Al_2O_3$, $SiO_2$, $RE_2O_3$, respectively is 5 to 50 mass % of $Al_2O_3$, 5 to 20 mass % of $SiO_2$, and the balanced amount of $RE_2O_3$, the grain boundary phase is contained in a range of 20 volume % or less to 100 volume % of the sintered body, and the Fe silicide particles is contained in 0.02 to 3 mass % in terms of Fe to 100 mass % of the sintered body.

Effects of the Invention

In the present invention, by reducing the z value indicating the dissolved amount of Al, O, and N into a silicon nitride crystal, and by optimizing the chemical composition of a grain boundary phase, especially $SiO_2$ composition, strength at room temperature, thermal conductivity, strength at high temperature, and thermal conductivity can be improved thereby to achieve a silicon nitride sintered body having high thermal shock resistance.

PREFERRED EMBODIMENTS FOR CARRYING OUT THE INVENTION

Silicon Nitride Sintered Body

A silicon nitride sintered body of the present invention is composed of β-sialon, as a principal phase, whose z value of the dissolved amount is 0.1 to 1 in a composition formula of $Si_{6-z}Al_zO_zN_{8-z}$, and the rest made up of a grain boundary phase containing RE-Al—Si—O, and Fe silicide particles. The component ratios of Al, Si and RE of the grain boundary phase in terms of $Al_2O_3$, $SiO_2$, $RE_2O_3$ are 5 to 50 mass % of $Al_2O_3$, 5 to 20 mass % of $SiO_2$, and the balanced amount of $RE_2O_3$. The grain boundary phase is 20 volume % or less in the sintered body. The Fe silicide particles is contained in 0.02 to 3 mass % in terms of Fe. The thermal conductivity of the silicon nitride sintered body can be determined by phonon propagation within β-sialon particles as the principle phase, having a low dissolved amount, and phonon propagation within the grain boundary phase.

The β-sialon $Si_{6-z}Al_zO_zN_{8-z}$ is a crystal whose Al, O, and N compositions are melt in solid state into a β-$Si_3N_4$ crystal, and therefore, when the z value of the dissolved amount is larger than 1, the crystal symmetry of the β-$Si_3N_4$ is considerably impaired, and the thermal conductivity within the β-sialon particles is lowered. When the z value is smaller than 0.1, sintering properties is lowered, and high temperature sintering for densification is needed, so that strength is lowered due to the generation of bulky particles. Hence, by setting the z value of the dissolved amount to 0.1 to 1, high thermal conductivity and high strength can be achieved to improve thermal shock resistance. As a result, the thermal conductivity at 800° C. is 10 W/(m·K) or more, and the four-point flexural strength at 800° C. is 500 MPa or more. Preferably, the z value of the dissolved amount is 0.3 to 0.8. This achieves a sintered body having a higher thermal conductivity and higher strength.

The grain boundary phase contains RE-Al—Si—O, and the component ratios of Al, Si and RE in terms of $Al_2O_3$, $SiO_2$, $RE_2O_3$ is 5 to 50 mass % of $Al_2O_3$, 5 to 20 mass % of $SiO_2$, and the balanced amount of $RE_2O_3$. It is important that the grain boundary phase is contained in 20 volume % or less in the sintered body. In the present invention, the component ratio of the grain boundary phase is expressed by regarding the sum of $RE_2O_3$, $Al_2O_3$, and $SiO_2$, as being 100 mass %.

In general, oxide or oxynitride containing RE-Al—Si is a component generated as follows. Powder raw materials such as $RE_2O_3$, $Al_2O_3$, and $SiO_2$ are reacted as the temperature is raised, and at 1400° C. or above, these and silicon nitride or sialon generate a liquid layer having good wettability, thereby dissolving silicon nitride or sialon. This facilitates densification of silicon nitride or sialon. Besides $SiO_2$ to be added as powder, oxygen to be generated in the grains or the surface part of silicon nitride or sialon powder, and further oxygen to be generated in the surface part of Si powder such as silicon nitride generated when grinding raw material and mixing may be considered as the $SiO_2$ component. These liquid layer compositions become a grain boundary phase containing RE-Al—Si—O by cooling after sintering. The N compositions of silicon nitride or sialon may be contained.

The RE in the above-mentioned grain boundary phase denotes Group III elements in the periodic table. Examples thereof are Sc, Y, La, Er, Yb, and Lu. In particular, Y is preferred. Since Y is a light element in the Group III elements in the periodic table, phonon propagation is superior and hence it is effective for improving the thermal conductivity of the grain boundary phase.

The reason why the component ratio of Al of the grain boundary phase is 5 to 50 mass % in terms of $Al_2O_3$ is as follows. When $Al_2O_3$ is smaller than 5 mass %, it will deviate greatly from the lowest liquid layer generation composition of $RE_2O_3$—$Al_2O_3$—$SiO_2$ (hereinafter referred to as low melting point composition) system. As a result, sintering temperature becomes high, and β-sialon crystal becomes bulky and has low strength. Similarly, when $Al_2O_3$ is larger than 50 mass %, it will deviate greatly from the low melting point composition. As a result, sintering temperature becomes high, and β-sialon crystal becomes bulky. Further, due to a large amount of $Al_2O_3$, the z value is likely to be larger than 1, and thermal conductivity is lowered.

The reason why the component ratio of Si is 5 to 20 mass % in terms of $SiO_2$ is as follows. When $SiO_2$ is smaller than 5 mass %, as in the case with $Al_2O_3$, it will deviate greatly from the low melting point composition, and sintering temperature becomes high. When $SiO_2$ is larger than 20 mass %, on the contrary, it approaches the low melting point composition. Therefore, the bond strength at high temperature between atoms constituting the grain boundary phase is lowered, and the lowered phonon propagation at high temperature deteriorates high temperature thermal conductivity and high temperature strength, resulting in poor thermal shock resistance. Accordingly, it is important that the component ratios of Al, Si and RE are 5 to 50 mass % in terms of $Al_2O_3$, 5 to 20 mass % in terms of $SiO_2$, respectively, and the rest is $RE_2O_3$. These component ratios are effective in improving sintering properties, and also particularly effective in improving high temperature thermal conductivity and high temperature strength by retaining the bond strength between atoms in the grain boundary phase at high temperature. In cases where the grain boundary phase exceeds 20 volume %, high temperature thermal conductivity and high temperature strength are lowered significantly.

A method of measuring the above-mentioned component ratio of the grain boundary phase will be described below when RE is Y, as an example. Firstly, by inductively coupled plasma (ICP) atomic emission spectroscopy, the contents (mass %) of Y and Al in the silicon nitride sintered body are measured, and the measured values are converted to contents (mass %) in terms of $Y_2O_3$ and $Al_2O_3$, respectively.

Next, with an oxygen analysis apparatus manufactured by, for example, LECO Corporation, the entire oxygen content (mass %) in the silicon nitride sintered body is measured. From this measured value, the obtained amount of oxygen component (mass %) of $Y_2O_3$ and $Al_2O_3$ is subtracted to obtain the remaining oxygen content (mass %). This is then converted to the amount of $SiO_2$ (mass %). Supposing the mass % of $Y_2O_3$, $Al_2O_3$, and $SiO_2$ thus calculated and the remainder to be $Si_3O_4$, these are divided by the following theoretical densities of 5.02 g/cm³ for $Y_2O_3$, 3.98 g/cm³ for $Al_2O_3$, 2.65 g/cm³ for $SiO_2$, and 3.18 g/cm³ for $Si_3N_4$, respectively, thereby obtaining their respective volume ratios. Then, the grain boundary phase can be calculated from these volume ratios. Further, the component ratio of the grain boundary phase can be calculated by regarding the sum of the mass % of $Y_2O_3$, $Al_2O_3$, and $SiO_2$ as being 100%. A similar method is applied when RE is Er, Yb, or Lu. In such a case, calculations may be made regarding their theoretical densities in $Er_2O_3$ as being 8.64 g/cm³, 9.18 g/cm³ in $Yb_2O_3$, and 9.42 g/cm³ in $LuO_2O_3$, respectively.

It is also important that the sintered body contains 0.02 to 3 mass % of Fe silicide particles in terms of Fe, to 100 mass % of the sintered body. The Fe silicide is scattered as a particle having a particle size of 50 μm or less, preferably 2 to 30 μm, in between the particles of β-sialon or in a grain boundary phase containing RE-Al—Si—O. Preferably, the Fe silicide particles exist in the form of $FeSi_2$, FeSi, $Fe_2Si$, $Fe_3Si$, or $Fe_5Si_3$. Among others, $FeSi_2$ (JCPDS#35-0822) is preferred. In the present invention, the content of Fe silicide particles is described by separating from that of the principle phase and the grain boundary phase.

These Fe silicides have a high coefficient of thermal expansion, and they seem to exert residual stress on β-sialon particles and the grain boundary phase. Therefore, they have the effect of improving the fracture toughness value of the sintered body, and are effective in improving thermal shock resistance. Upon the occurrence of a grain boundary slip that is a fracture form at high temperature, the Fe silicides function as wedges for preventing the β-sialon particles from slipping. They have the effect of improving high temperature strength, and are effective in improving thermal shock resistance.

Further, these Fe silicides function as one of liquid layer compositions during the time of sintering, and are effective in improving sintering properties. When the content thereof is less than 0.02 mass % in terms of Fe, the effect of improving the fracture toughness value of the sintered body and the effect of improving high temperature strength are low, and the effect of improving sintering properties is low. Since the Fe silicides have a low thermal conductivity, and when the content thereof exceeds 3 mass %, the thermal conductivity of the sintered body is lowered. The shapes and the particle sizes of the Fe silicides can be confirmed by ultimate analysis such as powder X-ray diffraction or electron probe micro analysis (EPMA). They can also be quantified by ICP atomic emission spectroscopy.

In order to exhibit high temperature high strength, not only the Fe silicides but also β-sialon crystal is controlled to have a mean particle size so that the shorter axis diameter is 2 μm or less, preferably 1 μm or less, and the longer axis diameter is 30 μm or less, preferably 15 μm or less. This provides the effect of suppressing a grain boundary slip. It is also desirable from the viewpoint of improving room temperature strength that the maximum particle size in a longer axis direction is 50 μm or less, preferably 30 μm or less. A maximum void size is 100 μm or less, preferably 30 μm or less. A relative density to a theoretical density is 96% or more, preferably 98% or more.

The particle size can be measured by observing a scanning electron microphotograph (SEM) of a magnification of ×5,000 in a measuring area of an arbitrary 400 μm². The maximum void size can be measured by observing, on a microscope of ×100, an arbitrary area of 1 mm² after mirror-finish grinding.

In the aforesaid sintered body, the thermal conductivity at 800° C. is 10 W/(m·K) or more, and the four-point flexural strength at 800° C. is 500 MPa or more, thus achieving high thermal conductivity and high strength at 800° C. The driving force of occurrence of cracks is the following fact that the temperature difference between inside and outside the sintered body are increased by rapid heating and rapid cooling from the exterior, and the thermal expansion difference and thermal shrinkage difference (volume change) of inside and outside the sintered body are increased. However, a thermal conductivity drop can increase the volume change so that it can be controlled to the thermal conductivity in a high temperature range having a low thermal conductivity.

Therefore, when the thermal conductivity at 800° C. is less than 10 W/(m·K), radiation properties is lowered and the volume change inside and outside the sintered body is increased, and thus cracks are liable to occur. Whether it is possible to endure the volume change depends on strength. A ceramics sintered body has a low strength in a high temperature range due to the softening of the grain boundary phase. Therefore, when the four-point flexural strength at 800° C. is less than 500 MPa, cracks are liable to occur. The thermal conductivity and the four-point flexural strength are measured by a method according to JIS R 1611 and a method according to JIS R 1601, respectively.

Preferably, the sintered body contains 0.1 to 5 mass % of W silicide particles in terms of W. Like the Fe silicide, the W silicide is scattered as a particle having a particle size of 50 μm or less, preferably 5 to 20 μm, in between the particles of β-sialon or in the grain boundary phase containing RE-Al—Si—O, Suitable form thereof is $WSi_2$, $W_5Si_3$, $WSi_3$, or $W_2Si_3$. Among others, $WSi_2$ (JCPDS#11-0195) is preferred.

The W silicides have a high thermal conductivity in the range of room temperature to 800° C., and they seem to function as thermal conduction between sialon particles. They are effective in improving thermal conductivity particularly at a high temperature range. When the content thereof is less than 0.1 mass % in terms of W, the effect of improving thermal conductivity is low. Over 5%, they are liable to become agglomerates of 50 μm or more, and the strength of the sintered body is lowered. In some cases, the W silicide particles and the above-mentioned Fe silicide particles are present adjacent to each other. This does not deteriorate the characteristic of the present invention.

In some cases, the Fe silicide particles and the W silicide particles are present so that the former surrounds the latter and vice versa. This does not deteriorate the characteristic of the present invention. In some cases, the element of the W silicide particles and oxygen are dissolved in the Fe silicide particles, and vice versa. This does not deteriorate the characteristic of the present invention. The shapes and the particle sizes of these metal silicides can be confirmed by ultimate analysis such as powder X-ray diffraction or electron probe micro analysis (EPMA). They can also be quantified by ICP atomic emission spectroscopy.

The grain boundary phase containing RE-Al—Si—O is preferably amorphous. The amorphous can be formed in cases where a composition being a liquid layer during sintering is solidified and cooled without being crystallized during cooling. In the presence of the amorphous, cracks can be developed preferentially in an amorphous part and hence there is the effect of improving fracture toughness value due to the deflection of the cracks, thereby improving thermal shock resistance. This effect is remarkable particularly in a temperature range of room temperature to 800° C.

Preferably, part of the aforesaid grain boundary phase is crystallized in at least one selected from borastenito phase, apatito phase, disilicate phase, and monosilicate phase. These crystals can be obtained when a composition being a liquid layer during sintering is crystallized during cooling. In particular, when the $Al_2O_3$ composition in the grain boundary phase is 15 mass % or less, it is susceptible to crystallization. In the presence of the above-mentioned crystal phases, the crystal symmetry is superior, and the thermal conductivity can be improved throughout the whole temperature range, and softening can be suppressed, thus contributing to an improvement in high temperature thermal conductivity in the vicinity of 800° C.

The borastenito phase, the apatito phase, the disilicate phase, and the monosilicate phase are compounds expressed by $RESiO_2N$, $RE_5(Si_4)_3N$, $RE_2Si_2O_7$, and $RE_2SiO_5$, respectively. A similar effect is obtainable when the above amorphous is crystallized by heat treatment at 1000 to 1400° C.

The foregoing silicon nitride sintered body of the present invention is 5 MPa·m$^{1/2}$ or more in fracture toughness value (JIS R 1607, SEPB method), 12 GPa or more in HV1 hardness (JIS R 1610), 2 GPa or more in compressive strength (JIS R 1608), 260 GPa or more in elastic modulus (JIS R 1602, ultrasonic pulse method), 2% or less in the amount of strain after applying stress of 200 MPa at 1000° C. for 10 hours (JIS R 1612, load point displacement measuring method), 3.5×10$^{-6}$/K or less in coefficient of linear thermal expansion between room temperature and 800° C. (JIS R 1618), and 1.5×10$^{-6}$/K or less in coefficient of linear thermal expansion between 20 and 30° C.

The foregoing silicon nitride sintered body has the following thermal conductivities. That is, it is 20 W/(m·K) or more at room temperature, 17 W/(m·K) or more at 200° C., 15 W/(m·K) or more at 400° C., 12 W/(m·K) or more at 600° C., and 8 W/(m·K) or more at 1000° C. The four-point flexural strength thereof is 750 MPa or more at room temperature, 600 MPa or more at 400° C., and 450 MPa or more at 1000° C.

<Manufacturing Method>

<First Manufacturing Method>

A first method of manufacturing the silicon nitride sintered body of the present invention will be described below. Firstly, silicon nitride powder having a rate of β phase transformation of 40% or less, which contains β type silicon nitride part having a z value of 0.5 or less, namely 0.5 or less in the dissolved amount when its composition formula is $Si_{6-Z}Al_ZO_ZN_{8-Z}$, and, as additive ingredients, $RE_2O_3$ powder, $Al_2O_3$ powder, and $Fe_2O_3$ powder, or alternatively together with $WO_3$ powder, are mixed and formed. This is then sintered at a nitrogen partial pressure of 50 to 300 kPa and a temperature of 1800° C. or less until an open porosity is 5% or less, and thereafter densified until its relative density is 96% or more.

Since the β type silicon nitride powder is liable to be a core of grain growth and become a bulky crystal having a small aspect ratio, and when the rate of β phase transformation exceeds 40%, strength and fracture toughness value are lowered. When the z value of the contained β type silicon nitride part exceeds 0.5, the powder becomes a core of grain growth, and the z value of β-sialon serving as the principle phase after sintering is likely to be over 1, and thermal conductivity is lowered. Hence, the rate of β phase transformation is suitably 40% or less, preferably 10% or less. The z value is preferably 0.5 or less. By so doing, a needle-like crystal structure having an aspect ratio of 5 or more can be obtained, resulting in high strength.

The rate of β phase transformation when the sum of peak strength α(102) diffraction line and α(210) diffraction line is $I_α$, and the sum of peak strength β(101) diffraction line and β(210) diffraction line is $I_β$, can be calculated by the following equation (A):

$$\text{Rate of β phase transformation (\%)} = [I_β/(I_α+I_β)] \times 100 \quad \text{(A)}$$

In the above-mentioned silicon nitride powder, $RE_2O_3$ powder, $Al_2O_3$ powder, and $Fe_2O_3$ powder, or alternatively together with $WO_3$ powder are wet-mixed and ground to obtain a wet slurry by using a well-known method such as barrel mill, tumbling mill, vibrating mill, or beads mill. As ground media, silicon nitride, zirconia, or alumia can be used. Preferred is a material having less influence of contamination as impurities, preferably silicon nitride of the identical material composition.

From the purposes of improving sintering properties and achieving the needle like crystal structure, it is desirable to carry out pulverization so that grading $D_{90}$ is 3 μm or less. Since the pulverization is carried out in the step of mixing and grinding, $RE_2O_3$ powder, $Al_2O_3$ powder, and $Fe_2O_3$ powder, or alternatively together with $WO_3$ powder may have a large particle size. Alternatively, the above-mentioned added powders may be pulverized in advance. The pulverization can be achieved by reducing the size of grinding media, increasing the amount of the grinding media, lowering the viscosity of the slurry, and prolonging the grinding time. Adding a dispersing agent is also desirable to reduce the slurry viscosity. However, for shortening the grinding time, it is desirable to use powder having a mean particle size of 1 μm or less.

Subsequently, the wet slurry so obtained is dried to obtain a dry powder body. It is desirable to remove foreign matter from the wet slurry by passing it through a mesh finer than #200, followed by deferrization using magnetic force. It is also desirable for improving forming properties to add and mix 1 to 10 mass % of an organic binder, such as paraffin wax, PVA (polyvinyl alcohol), or PEG (polyethylene glycol), to 100 mass % of the powder weight, in the state of the wet slurry. No special limitation is imposed on the drying method. For example, a beaker or spray drier may be used for drying.

The obtained dry powder body is then subject to pressing or CIP (cold isostatic pressing), resulting in a formed body having a desired shape having a relative density of 45 to 60%. Forming pressure in the range of 500 to 3000 kgf/cm$^2$ is desirable from the viewpoints of improvements in the density of the formed body and the collapse characteristic of the dry powder body. Especially in case of pressing, the range of 500 to 1200 kgf/cm$^2$ is preferred for preventing cracks during the pressing.

Alternatively, other forming method such as casting, mold injection, or tape forming may be employed. After forming, the formed body may be made in a desired shape by cutting, stacking, or bonding. The obtained formed body is preferably degreased using nitrogen or vacuum. Degreasing temperature depends on the type of added organic binder, and it is preferably 900° C. or less, especially 500 to 800° C.

The formed body is preferably placed in a sagger. This suppresses volatilization of compositions during the sintering, and also prevents attachment of foreign matter from the exterior. The sagger is preferably made of silicon nitride, silicon carbide, or a complex thereof. When the sagger has a high porosity, silicon nitride powder may be applied to the surface thereof. Alternatively, silicon nitride powder may be applied to the surface of carbonaceous material. For suppressing volatilization of the compositions contained in the formed body, a coexisting ingredient containing a composition such as $RE_2O_3$, $Al_2O_3$, or $SiO_2$ may be placed in the sagger.

The sintering process will be described below. For example, it is possible to employ a kiln using graphite heating element, which is usable for a general silicon nitride sintered body. Alternatively, the sintering can also be carried out in an electric furnace (in atmosphere) by using the method where the sagger containing the formed body is buried in a powder, from which carbon dioxide in atmosphere is removable, such as carbon powder, or the method where the sagger is filled with silicon nitride powder or silicon carbide powder, and the formed body is buried therein. In this case, the oxygen gas in the atmosphere can be removed, and nitrogen partial pressure is equal to atmospheric pressure, thus falling in the range of the nitrogen pressure of the present invention to be described below.

Next, the sagger is directly placed in the kiln, and sintered at a nitrogen partial pressure of 50 to 300 kPa and a temperature of 1800° C. or less until an open porosity is 5% or less, and thereafter densified until its relative density is 96% or more.

Specifically, the temperature is raised under vacuum from room temperature to 300 to 1000° C., and thereafter nitrogen gas of 50 to 300 kPa is introduced. At this time, because the open porosity of the formed body is about 40 to 55%, the nitrogen gas can be charged sufficiently in the formed body. Subsequently, in the vicinity of 1000 to 1400° C., sintering additive ingredient forms a liquid layer composition by solid phase reaction. In a temperature range of about 1400° C. or more, $Si_3N_4$ (sialon) composition is dissolved to deposit β-sialon, and then densification is initiated.

The β-sialon is the substitutional solid solution of β-$Si_3N_4$, resulting from the substitution of $Al^{3+}$ for $Si^{4+}$, and the substitution of $O^{2-}$ for $N^{3-}$. As described in many phase diagrams of $Si_3N_4$—AlN—$Al_2O_3$—$SiO_2$ system (for example, in K. H. Jack, J. Mater. Sci., 11 (1976) 1135-1158, FIG. 11), in a stable region of β (or called β')-sialon phase, $N^{3-}$ is insufficient for stabilizing valence with respect to $Si_3N_4$—$Al_2O_3$—$SiO_2$ system, and thus requiring the supply of N composition from the exterior. The present inventor therefore considered intensively carefully and discovered that nitrogen gas being sintering atmosphere can compensate for the above-mentioned insufficiency of N composition, and minimizing nitrogen partial pressure can reduce the z value of β-sialon.

That is, when the open porosity is sufficiently large (in the stage where the open porosity reaches 5% from 40 to 55%), it is necessary to set nitrogen partial pressure as low as possible. In the present invention, the upper limit is 300 kPa. Under the nitrogen partial pressure exceeding 300 kPa, the substitutional solid solution conversion of Al, O, and N into β-$Si_3N_4$ is advanced and the z value is liable to exceed 1, leading to a thermal conductivity drop. Below 50 kPa, that is smaller than the balanced nitrogen partial pressure of β-sialon (or $Si_3N_4$), and the decomposition reaction of β-sialon (or $Si_3N_4$) is advanced to form molten metal Si, failing to be a normal silicon nitride sintered body.

On the other hand, when the temperature exceeds 1800° C., the substitutional solid solution conversion of Al, O, and N into β-$Si_3N_4$ is advanced, and thus the z value is liable to exceed 1, and thermal conductivity is lowered. When sintering is advanced and open porosity is 5% or less, the amount of supply of $N_2$ to a sample can be reduced. Therefore, even for a nitrogen partial pressure exceeding 300 kPa, there is no problem. Even for a temperature of 1800° C. or more, a silicon nitride sintered body of high strength and high thermal conductivity can be achieved by advancing densification until the relative density is finally 96% or more. The final densifying temperature of 1800° C. or less is effective in achieving a fine crystal structure.

From an economical point of view, it is desirable to set every nitrogen partial pressure to 150 kPa or less. In order to further facilitate densification, high-pressure gas pressure pressing of 200 MPa or less, hot isostatic pressing (HIP) may be carried out at the point the open porosity is 5% or less. In this case, preferably under the open porosity of 1% or less, after sintering is advanced until a relative density of 97% or more, preferably 99% or more, high-pressure gas pressure pressing or the HIP may be carried out.

In the present invention, it was also invented that the existence of oxygen composition when the added $Fe_2O_3$ powder or $WO_3$ powder becomes Fe silicide or W silicide by sintering, is effective in lowering the z value of β-sialon. Although the $Fe_2O_3$ powder or the $WO_3$ powder forms silicide by reaction with β-Sialon ($Si_3N_4$) being principle phase, it seems that β-sialon phase transformation proceeds by the existence of oxygen composition separated at that time, then further supply of N composition becomes a necessity, enabling the z value to be lowered.

<Second Manufacturing Method>

Although the silicon nitride sintered body can be obtained by the foregoing first manufacturing method, the following second manufacturing method is preferred.

In the second manufacturing method, firstly, silicon nitride powder similar to the above, the above-mentioned additive powder, and metal silicon powder are mixed and formed so as to be 1 to 10 in weight ratio of (metal silicon powder)/(silicon nitride powder), thereby preparing a formed body. This is then sintered at a nitrogen partial pressure of 50 kPa to 1.1 Ma, and in a temperature range of 1000 to 1400° C., thereby preparing a porous nitride body where the metal silicon powder is converted to silicon nitride. Subsequently, this nitride body is sintered at a nitrogen partial pressure of 50 to 300 kPa, and at a temperature of 1800° C. or less until an open porosity is 5% or less, and thereafter densified until relative density is 96% or more, resulting in the silicon nitride sintered body.

The above-mentioned metal silicon powder can be wet-mixed and ground with IPA (isopropyl alcohol) or the like at the same time as the above-mentioned silicon nitride powder and the additive powder, or it can also be separately ground and then wet-mixed. However, bulky metal silicon particles are liable to thereafter cause poor nitriding and poor sintering. It is therefore important to ground the metal silicon particles solely so that grading $D_{90}$ is 10 μm or less, preferably 6 μm or less. In case of wet-mixing and grinding, or wet-mixing after separately grinding, it is important to control the grading $D_{90}$ of the mixed powder to 5 μm or less. Since pulverization is carried out in the mixing and grinding process, it is economically effective to use inexpensive metal silicon powder having a large particle size of, for example, #40 mesh or less. Any one of the mixing and grinding method, the drying method, the forming method, degreasing method, the sintering and setting method may be selected from the foregoing well-known methods. It should be noted that the formed body containing the metal silicon powder approaches dense filling than the case of not containing that, and have a relative density of 50 to 65%.

When the weight ratio of (metal silicon powder)/(silicon nitride powder) is larger than 10, it is difficult to control any rapid nitriding reaction, and temperature excursion might occur. When the weight ratio is smaller than 1, the above-mentioned merit might not be exhibited satisfactorily. Hence, the weight ratio of (the metal silicon powder)/(the silicon nitride powder) is 1 to 10, preferably 3 to 8.

Next, the formed body containing the metal silicon powder is then sintered under the above-mentioned conditions, namely, at a nitrogen partial pressure of 50 kPa to 1.1 MPa, and in a temperature range of 1000 to 1400° C., thereby preparing the porous nitride body where the metal silicon powder is converted to silicon nitride (nitriding reaction). In this porous nitride body, the rate of β phase transformation of a silicon nitride part is 40% or less, and the z value is 0.5 or less.

Specifically, the metal silicon powder generates $Si_3N_4$ composition by nitriding reaction with $N_2$ gas. At this time, the generated $Si_3N_4$ composition has a larger volume than the metal silicon powder composition, and causes volume expansion so as to burry void parts of the porous body. Therefore, the relative density can be increased to 55 to 70% by the nitriding reaction, and the succeeding coefficient of contraction during sintering is lowered, enabling suppression of the deformation during sintering.

Additionally, the increased relative density decreases open porosity, and the amount of nitrogen gas to be filled in the formed body can be reduced. This provides the merit that the amount of supply of the necessary N composition for β-sialon phase transformation during sintering can be reduced thereby to reduce the z value.

In the nitriding in a temperature range of 1000 to 1400° C., there is also the merit that $RE_2O_3$—$Al_2O_3$—$SiO_2$ causes solid phase reaction, and $Al_2O_3$ is unsusceptible to solid solution transformation into $Si_3N_4$. However, because nitriding reaction is exothermic reaction, a rapid nitriding reaction may cause self-heating and then temperature excursion. There is a danger that nitriding to β-$Si_3N_4$ (sialon) having lower sintering properties than α-$Si_3N_4$, further Si-melt may occur.

When the nitrogen partial pressure is smaller than 50 kPa, the nitriding reaction takes a long period of time, and insufficient nitriding might occur. When it exceeds 1.1 MPa, a rapid nitriding reaction occurs, and temperature excursion is likely to occur. No nitriding reaction is advanced at temperatures lower than 1000° C. Over 1400° C., non-nitriding Si may be melt to cause cracks, which is undesirable. Additionally, over 1400° C., there is a tendency that a liquid layer containing RE—Al—Si—O is generated, and deposition of β-sialon having a large z value is initiated, resulting in a sintered body having a low thermal conductivity.

More preferably, nitriding reaction is advanced as follows. That is, in the formed body containing Si powder, nitriding is initiated from Si powder in the surface of the formed body in the nitriding process, and the nitriding of Si powder existing more inside the formed body is advanced with time. As a result, there exists the state where the amount of Si existing inside is larger than that in the surface of the formed body in the middle or the end of the nitriding process.

For completely nitriding the formed body from this state, it is necessary to carry out nitriding at high temperature (a second nitriding process) after nitriding at low temperature (a first nitriding process). That is, it is preferable to advance the succeeding uniform sintering by controlling exothermic reaction due to nitriding, by the first nitriding process which includes nitriding 10 to 70 mass % of Si powder in the above-mentioned formed body at temperatures of 1000 to 1200° C., and bringing the rate of β phase transformation of the entire silicon nitride (sialon) into less than 30%, and the second nitriding process which includes obtaining a nitride body by converting the remainder of the Si powder in the above-mentioned degreased body to silicon nitride (sialon) at 1100 to 1400° C., and bringing the rate of β phase transformation of the entire silicon nitride (sialon) into less than 40%. The temperature of the second nitriding process is set higher than the temperature of the first nitriding process. It is economically preferable to perform successively the first and second nitriding processes.

The nitriding of the metal silicon powder in this manner leads to a porous nitride body whose silicon nitride part has a rate of β phase transformation of 40% or less, and a z value of 0.5 or less. Preferably, a porous nitride body has a rate of β phase transformation of 10% or less because it can form a needle-like crystal structure that has an aspect ratio of at least 5, and high strength. As described above, it is desirable to minimize a z value before sintering. If the nitriding causes β-sialon powder whose z value exceeds 0.5, this powder becomes a core of grain growth, and the z value of β-sialon serving as the principle phase after sintering is likely to exceed 1, and thermal conductivity is lowered.

The sintering and densifiction method may be similar to the foregoing method. From economical point of view such as a reduction in the process, it is preferable to perform successively the nitriding reaction process and the sintering and densification process. Alternatively, these may be carried out separately.

The above silicon nitride sintered body is suitably used in the following applications: members used for molten metals such as aluminium (members for molten metals), for example, stokes, burner tubes, heater tubes, thermocouple protective tubes for aluminium low-pressure casting; diecast sleeves, burner tubes, heater tubes, thermocouple protective tubes, ladles, and casting dies for diecast; pistons, sleeves, nozzles, and piston holding members for hot chambers.

For example, in the stokes, burner tubes, heater tubes, thermocouple protective tubes for aluminium low-pressure casting, it is also possible to improve thermal conductivity and temperature response by utilizing the characteristic that the silicon nitride sintered body has a high thermal conductivity at 800° C. in the vicinity of aluminium melt temperature. High strength and superior thermal shock resistance at 800° C. enable the above products to withstand any rapid temperature change. As a result, the silicon nitride sintered body can also be used suitably in various members for melt-resistant metals. This suppresses contamination of the cracks of members due to thermal shock, making it possible to cast high quality metal containing less impurities.

The silicon nitride sintered body can be used suitably in members for machining metal or iron and steel such as lining members for high temperature wear resistance, for example, squeeze rolls and skid buttons for hot working; casting dies for casting; quenching jigs for induction hardening; sputtering nozzles and air pins for welding. This is because these applications require excellent thermal shock resistance and high temperature strength. In particular, the present invention can be suitably used for the above-mentioned hot working, namely the members for hot working.

The silicon nitride sintered body of the present invention can also be used suitably in members for grinders, such as disks, sleeves, nozzles, liners, rolls, and media for grinders; tanks and arm parts for mixers and agitators; and sleeves and bushes for centrifugal separators. In addition, it can also be used suitably for members such as cutters, knives, tools, paper manufacturing, ink jets, fluid bearings, bearing balls for machine tools and hard disks, lifting tools, thread handling areas, and forming dies. In these applications, wear resistance can be further improved by controlling the porosity to 3% or less.

The silicon nitride sintered body of the present invention can also be used suitably in members for finishing machines, such as wire rollers, wire guides, and insulating plates for electric discharge machining; capstans, bending rolls, spinning rolls, and canning members for metal plastic working; and insulating parts for laser machining.

The silicon nitride sintered body of the present invention can also be used suitably in members for pumping parts such as wear resistant sealing for digging members (members for digging), large vertical bearings of pumping parts, and ball valves for high temperature.

The silicon nitride sintered body of the present invention can also be used suitably in members for energy, such as burner rings and flame holding rings of burner parts in thermal power generation, and lining members and nozzles of high temperature wear resistant parts.

By utilizing the heat resistance, wear resistance, and strength properties of less variations of the silicon nitride sintered body of the present invention, it can also be used suitably in various kinds of ceramic engine members, for example, automobile engine members such as turbo rotors, cam roller, swirl chambers, exhaust control valves, supply and exhaust valves, locker arms, piston pins, sealing, jet pump parts of fuel containing high pressure, glow plugs, and ceramic heaters; gas engine members such as head liners, cylinder liners, piston crowns, valves, and valve guides; and gas turbine members such as turbine rotors, converters, various rings, and various nozzles.

Since the silicon nitride sintered body of the present invention can be controlled so as to have an HV1 hardness of 12 GPa or more and a compressive strength of 2 GPa or more, it can be used suitably as a protector or an impact absorber in the event that an inorganic member such as a metal member flies to or collide with living beings or objects.

Since the silicon nitride sintered body of the present invention has a high elastic modulus and a small coefficient of linear thermal expansion at 20 to 30° C., it can be used suitably, in particular, as parts of positioning tables for which high-precision positioning is required. It is also applicable to mirrors of exposure systems for use in manufacturing semiconductors or liquid crystals.

The following examples illustrate the present invention in more detail. It is understood, however, that the examples are for the purpose of illustration and the invention is not to be regarded as limited to these examples.

Example 1

Silicon nitride powder (3 µm in mean particle size $D_{50}$, 200 ppm in Al content, and 0.9 mass % in oxygen content) having a 10% in the rate of β phase transformation ($Z \leq 0.1$ when $\beta\text{-}Si_{6-z}Al_zO_zN_{8-z}$, $Y_2O_3$ powder (0.9 µm in mean particle size $D_{50}$), $Er_2O_3$ powder (0.9 µm in mean particle size $D_{50}$), $Yb_2O_3$ powder (2.3 µm in mean particle size $D_{50}$), $Lu_2O_3$ powder (0.6 µm in mean particle size $D_{50}$), $Al_2O_3$ powder (0.5 µm in mean particle size $D_{50}$), $SiO_2$ powder (1.9 µm in mean particle size $D_{50}$), and $Fe_2O_3$ powder (0.6 µm in mean particle size $D_{50}$), each powder having a predetermined amount, were ground and mixed in water by a vibrating mill for 72 hours, thereby preparing a mixed powder slurry having 1.5 µm in mean particle size $D_{90}$.

Then, 5 mass % of PVA (polyvinyl alcohol) to the powder weight was added and then passed through a #400 mesh to remove foreign matters. This was then deionized by a deionizer and dried. The dry powder body was pressed at a pressure of 800 kgf/cm², to obtain a metallic mold pressed body of 100 mm square having a thickness of 6 mm.

After the PVA was removed from the pressed body in nitrogen of 600° C., this was placed in a sagger made of silicon nitride, and sintered at 1750° C. in nitrogen of 110 kPa for 15 hours. Archimedes' method was used to measure open porosity, and all of the results were 2% or less. Another sintering was carried out at 1800° C. in nitrogen of 300 kPa for 5 hours, thereby obtaining a silicon nitride sintered body having a relative density of 97% or more.

A variety of test pieces were sectioned from the obtained sintered body, and their thermal conductivity at 800° C. (JIS R 1611) and four-point flexural strength (JIS R 1601) were measured. Their thermal shock resistance was evaluated in the following manner. That is, ten transverse rupture test pieces according to JIS R 1601, heated to 825° C. were subject to thermal shock damage by putting them in water of 25° C. (ΔT=800° C., JIS R 1648 relative method). Successively, residual bending strength (an average value of the 10 pieces in four-point flexural strength at room temperature) was measured, and a strength reduction rate to the initial strength when no thermal shock damage is exerted (an average value of the 10 pieces in four-point flexural strength at room temperature) was calculated and judged. In the judgment, rank A denotes within 5% in strength reduction rate, rank B denotes above 5% and below 10% in strength reduction rate, rank C denotes above 10% and below 30% in strength reduction rate, and rank D denotes above 30% in strength reduction rate. The rank D is beyond the range in the present invention.

The z value of β-sialon in the sintered body was calculated as follows. That is, the sintered body was ground to a #200 mesh or less. As an angle correction sample, approximately 60 mass % of high-purity α-silicon nitride powder (E-10 grade and 20 ppm or below in Al content, manufactured by Ube Industries, Ltd.) was externally added and mixed uniformly in a mortar. Then, profile strength was measured by powder X-ray diffraction method under conditions that an analysis range of 2θ=33 to 37°, 0.002° in scanning step width, and Cu—Kα rays (λ=1.54056 Å).

The angle was corrected by using a peak top obtainable from the angle correction sample. That is, a difference ($\Delta 2\theta_1$) between an average 2θ of the upper 10 points of the peak strength obtainable per 0.002° of α(102) appeared in the vicinity of 2θ=34.565°, and 34.565° was found. Next, a difference ($\Delta 2\theta_2$) between an average 2θ of the upper 10 points of the peak strength obtainable per 0.002° of α(210) appeared in the vicinity of 2θ=35.333°, and 35.333° was found. The average of these differences, ($\Delta 2\theta_1 + \Delta 2\theta_2$)/2, was taken as a correction Δ2θ. Then, an angle, which was obtained by correcting, with the correction Δ2θ, the average 2θ of the upper 10 points of the peak strength obtainable per 0.002° of β(210) appeared in the vicinity of 2θ=36.055°, was taken as a peak position ($2\theta_\beta$) of β(210) of the sintered body. A lattice constant a (Å) was obtained by substituting the peak position ($2\theta_\beta$) in the following formula (B):

$$\sin^2\theta_\beta = \frac{[\lambda^2(h^2+hk+k^2)]/3}{a^2} + \frac{\lambda^2 l^2/4}{c^2} \quad (B)$$

Specifically, when (hkl)=(210) is substituted in the above formula (B), the second paragraph of the formula (B), namely ($\lambda^2 l^2/4$)/$c^2$, is zero, and further expanded to find the lattice constant a (Å). A value z value was obtained by reading the value of the lattice constant a (Å) from a graph between the lattice constant a (Å) and the dissolved amount z, as described in K. H. Jack, J. Mater. Sci., 11 (1976) 1135 to 1158, FIG. 13.

The component ratios of $RE_2O_3$ and $Al_2O_3$ and $SiO_2$, and the amount of grain phase layer were obtained as follows. That is, the contents (mass %) of RE and Al in the silicon nitride sintered body were measured by ICP atomic emission spectroscopy, and the obtained contents were converted to the contents (mass %) in terms of $RE_2O_3$ and $Al_2O_3$, respectively. Next, the entire oxygen content (mass %) in the silicon nitride sintered body was measured by using the oxygen analysis apparatus manufactured by LECO Corporation. The aforesaid amount of oxygen component (mass %) of $RE_2O_3$ and $Al_2O_3$ were then subtracted from the measured value. The remaining oxygen content (mass %) was then converted to an amount of $SiO_2$ (mass %).

Supposing the mass % of $RE_2O_3$, $Al_2O_3$, and $SiO_2$ thus calculated and the remainder to be $Si_3O_4$, these were divided by the following theoretical densities: 5.02 g/cm³ for $Y_2O_3$, 8.64 g/cm³ for $ER_2O_3$, 9.18 g/cm³ for $Yb_2O_3$, 9.42 g/cm³ for $Lu_2O_3$, 3.98 g/cm³ for $Al_2O_3$, 2.65 g/cm³ for $SiO_2$, and 3.18 g/cm³ for $Si_3N_4$, respectively, thereby obtaining their respective volume ratios. From these, a volume % of the grain boundary phase was obtained.

Further, the component ratio of the grain boundary phase was calculated by regarding the sum of the mass % of $RE_2O_3$, $Al_2O_3$, and $SiO_2$ as being 100%. The content of Fe was found by ICP atomic emission spectroscopy. The type of Fe silicide was identified by powder X-ray diffraction method.

The obtained results are shown together in Table 1.

TABLE 1

| Sample No. | z value of β-sialon | Component ratio of the grain boundary phase (mass %) | | | | Ratio of the grain boundary phase (volume %) | Content of Fe (mass %) | Type of Fe silicide | Characteristic at 800° C. | | |
|---|---|---|---|---|---|---|---|---|---|---|---|
| | | $Al_2O_3$ | $SiO_2$ | Type of RE | $RE_2O_3$ | | | | Strength (MPa) | Thermal conductivity [W/(m·K)] | Thermal shock resistance |
| *1 | <0.1 | 2 | 15 | Y | 83 | 10 | 0.8 | $FeSi_2$ | 350 | Insufficient densification | D |
| 2 | 0.1 | 5 | 13 | Y | 82 | 13 | 1.0 | $FeSi_2$ | 520 | 27 | B |
| 3 | 0.4 | 14 | 11 | Y | 75 | 10 | 0.8 | $FeSi_2$ | 680 | 22 | A |
| 4 | 0.5 | 25 | 10 | Y | 65 | 11 | 0.7 | $FeSi_2$ | 820 | 17 | A |
| 5 | 0.7 | 42 | 8 | Y | 50 | 9 | 0.4 | $FeSi_2$ | 910 | 13 | B |
| 6 | 1.0 | 48 | 8 | Y | 44 | 10 | 0.6 | $FeSi_2$ | 770 | 10 | C |
| *7 | 1.3 | 70 | 7 | Y | 23 | 10 | 0.8 | $FeSi_2$ | 530 | 5 | D |
| *8 | 0.5 | 30 | 2 | Y | 68 | 9 | 0.6 | $FeSi_2$ | 400 | 11 | D |
| 9 | 0.4 | 27 | 5 | Y | 68 | 11 | 0.5 | $FeSi_2$ | 510 | 16 | B |
| 10 | 0.4 | 21 | 19 | Y | 60 | 7 | 0.5 | $FeSi_2$ | 630 | 10 | B |
| *11 | 0.5 | 25 | 28 | Y | 47 | 12 | 0.7 | $FeSi_2$ | 370 | 7 | D |
| 12 | 0.4 | 29 | 16 | Y | 55 | 15 | 0.4 | $FeSi_2$ | 730 | 13 | B |
| 13 | 0.3 | 22 | 13 | Y | 65 | 20 | 0.3 | $FeSi_2$ | 590 | 14 | C |
| *14 | 0.5 | 31 | 15 | Y | 54 | 27 | 0.4 | $FeSi_2$ | 410 | 6 | D |
| *15 | 0.3 | 27 | 15 | Y | 58 | 10 | 0.01 | — | 400 | 16 | D |
| 16 | 0.5 | 35 | 12 | Y | 53 | 9 | 0.02 | $FeSi_2$ | 580 | 15 | C |
| 17 | 0.6 | 30 | 12 | Y | 58 | 8 | 0.1 | $FeSi_2$ | 750 | 17 | B |
| 18 | 0.4 | 29 | 13 | Y | 58 | 9 | 1.5 | FeSi | 760 | 12 | B |
| 19 | 0.4 | 23 | 17 | Y | 60 | 12 | 2.9 | $Fe_2Si\ Fe_5Si_3$ | 800 | 10 | C |
| *20 | 0.5 | 30 | 9 | Y | 61 | 14 | 3.8 | $Fe_5Si_3$ | 760 | 8 | D |

TABLE 1-continued

| | | Component ratio of the grain boundary phase (mass %) | | | | Ratio of the grain boundary phase (volume %) | Content of Fe (mass %) | | Characteristic at 800° C. | | |
|---|---|---|---|---|---|---|---|---|---|---|---|
| Sample No. | z value of β-sialon | Al$_2$O$_3$ | SiO$_2$ | Type of RE | RE$_2$O$_3$ | | | Type of Fe silicide | Strength (MPa) | Thermal conductivity [W/(m·K)] | Thermal shock resistance |
| 21 | 0.5 | 10 | 7 | Er | 83 | 11 | 0.8 | FeSi$_2$ | 770 | 14 | B |
| 22 | 0.4 | 8 | 6 | Yb | 86 | 12 | 0.7 | FeSi$_2$ | 750 | 13 | B |
| 23 | 0.5 | 7 | 5 | Lu | 88 | 11 | 0.7 | FeSi$_2$ | 720 | 13 | B |

Sample marked '*' is out of the scope of the present invention.

The following will be noted from Table 1.

Sample 1, in which the z value was smaller than 0.1, and the component ratio of Al$_2$O$_3$ in the grain boundary phase was smaller than 5 mass %, had insufficient densification and a low strength at 800° C., due to a considerable drop in sintering properties. Sample 7, in which the z value was larger than 1, and the component ratio of Al$_2$O$_3$ in the grain boundary phase was larger than 50 mass %, had an extremely low thermal conductivity at 800° C., and poor thermal shock resistance.

Sample 8, in which the component ratio of Si$_2$O$_3$ in the grain boundary phase was smaller than 5 mass %, had many voids due to poor sintering, and had a low strength at 800° C. In contrast, Sample 11, in which the component ratio of Si$_2$O$_3$ in the grain boundary phase was larger than 20 mass %, had poor thermal shock resistance because the bond strength at high temperature between the atoms constituting the grain boundary phase was weakened and hence the phonon propagation at high temperature was lowered, and high temperature thermal conductivity and high temperature strength were lowered.

Sample 14, in which the grain boundary phase exceeded 20 volume %, had a low thermal conductivity at 800° C. and a low strength at 800° C., and had poor thermal shock resistance. Sample 15, in which the Fe content was smaller than 0.02 mass %, had a low strength at 800° C. Sample 20, in which the Fe content exceeded 3 mass %, had poor thermal shock resistance due to a drop in thermal conductivity at 800° C.

On the other hand, Samples 2 to 6, 9, 10, 12, 13, 16 to 19, and 21 to 23, all of which were within the range of the present invention, had good results. That is, these samples were 500 MPa or more in strength at 800° C., 10 W/(m·K) or more in thermal conductivity at 800° C., and within 30% in strength reduction rate at ΔT=800° C. (at least the rank C in the judgment of thermal shock resistance). Although Samples 21, 22, and 23, in which RE was Er, Yb, and Lu, respectively, were within the range of the present invention, these had a lower thermal conductivity at 800° C. than Sample 3 having a similar composition when RE was Y. That is, the thermal conductivity was superior when RE was Y.

Example 2

Silicon nitride powder (4.5 μm in mean particle size D$_{50}$, and 0.7 mass % in oxygen content) having a 25% in the rate of β phase transformation (Z=0.5 when β-Si$_{6-z}$Al$_z$O$_z$N$_{8-z}$), and Y$_2$O$_3$ powder, Al$_2$O$_3$ powder, and Fe$_2$O$_3$ powder, which were identical to that in Example 1, and WO$_3$ powder having a mean particle size of 5.3 μm were ground and mixed in IPA by a tumbling mill for 120 hours, thereby preparing a mixed powder slurry of D$_{90}$=1.5 μm.

Then, 3 mass % of PVA to the powder weight was added and passed through a #400 mesh to remove foreign matters. This was then deionized by a deionizer, and dried. The dry powder body was pressed at a pressure of 800 kgf/cm$^2$ to obtain a metallic mold pressed body of 100 mm square having a thickness of 6 mm.

After the PVA was removed from the pressed body in nitrogen of 600° C., this was placed in a sagger made of silicon nitride, and sintered at 1800° C. in nitrogen of 110 kPa for 15 hours. Archimedes' method was used to measure open porosity, and all of the results were 2% or less. Another sintering was carried out at 1840° C. in nitrogen of 300 kPa for 5 hours, and then cooled at 100° C. per hour, thereby obtaining a silicon nitride sintered body having a relative density of 97% or more. Test pieces were prepared from the obtained sintered body by using the method described in Example 1, and their thermal conductivity at 800° C. (JIS R 1611), four-point flexural strength (JIS R 1601), and thermal shock resistance (ΔT=800° C., JIS R 1648 relative method, residual bending strength measurement) were measured in the same manner as in Example 1. The z value of β-sialon in the sintered body, the component ratios of Y$_2$O$_3$ and Al$_2$O$_3$ and SiO$_2$ in the grain boundary phase, the amount of the grain boundary phase, the content of Fe, and the type of Fe silicide were obtained in the same manner as in Example 1. Measurement of the content of W and identification of the type of W silicide were made by ICP atomic emission spectroscopy and powder X-ray diffraction method, respectively, as in the case with Fe.

These results are shown together in Table 2.

TABLE 2

| Sample No. | z value of β-sialon | Component ratio of the grain boundary phase (mass %) | | | Amount of the grain boundary phase (volume %) | Content of Fe (mass %) | Type of Fe silicide | Content of W (mass %) | Type of W silicide | Characteristic at 800° C. | | |
|---|---|---|---|---|---|---|---|---|---|---|---|---|
| | | Al$_2$O$_3$ | SiO$_2$ | Y$_2$O$_3$ | | | | | | Strength (MPa) | Thermal conductivity [W/(m·K)] | Thermal shock resistance |
| 24 | 0.8 | 44 | 17 | 39 | 16 | 1.0 | FeSi$_2$ | 0.05 | — | 770 | 11 | C |
| 25 | 0.8 | 40 | 16 | 44 | 18 | 1.1 | FeSi$_2$ | 0.1 | WSi$_3$ | 820 | 15 | B |

TABLE 2-continued

| Sample No. | z value of β-sialon | Component ratio of the grain boundary phase (mass %) | | | Amount of the grain boundary phase (volume %) | Content of Fe (mass %) | Type of Fe silicide | Content of W (mass %) | Type of W silicide | Characteristic at 800° C. | | Thermal shock resistance |
|---|---|---|---|---|---|---|---|---|---|---|---|---|
| | | $Al_2O_3$ | $SiO_2$ | $Y_2O_3$ | | | | | | Strength (MPa) | Thermal conductivity [W/(m·K)] | |
| 26 | 0.9 | 38 | 18 | 44 | 17 | 1.2 | $FeSi_2$ | 0.5 | $WSi_2$ | 930 | 16 | A |
| 27 | 0.8 | 41 | 15 | 44 | 19 | 1.2 | $FeSi_2$ | 2 | $WSi_2$ | 780 | 16 | A |
| 28 | 0.7 | 43 | 17 | 40 | 16 | 1.0 | $FeSi_2$ | 5 | $W_5Si_3$ $W_2Si_3$ | 610 | 17 | B |
| 29 | 0.9 | 44 | 18 | 38 | 18 | 1.3 | $FeSi_2$ | 8 | $W_5Si_3$ | 530 | 15 | C |
| 30 | 0.4 | 23 | 9 | 68 | 12 | 0.7 | $FeSi_2$ | 1 | $WSi_2$ | 920 | 19 | A |
| 31 | 0.2 | 14 | 19 | 67 | 18 | 0.7 | $FeSi_2$ | 1 | $WSi_2$ | 720 | 17 | B |

As apparent from Table 2, any one of the samples had superior thermal shock resistance judged as rank C or above. In particular, Samples 25 to 28, 30, and 31, each having a content of W in the range of 0.1 to 5 mass %, achieved an improvement in thermal conductivity at 800° C. and strength at 800° C., and had excellent thermal shock resistance judged as rank B or above.

Example 3

The grain boundary phase containing Y—Al—Si—O of Sample 28 (rank B) in Example 2 was confirmed as melilite phase by powder X-ray diffraction method. The same sample was raised to 1840° C. by the same set method as in Example 2, and then cooled at 200° C. per hour (Sample 28A). The sample was analyzed variously in the same manner as in Examples 1 and 2, and it was confirmed that the z value, the component ratios of the grain boundary phase, the contents of Fe and W, and the type of silicide were identical with that of Sample 28 of Example 2. Further, the fracture toughness value was measured by the method according to the JIS R 1607, SEPB method. The results are shown in Table 3.

Hence, it was confirmed that the fracture toughness value in the range of room temperature to 800° C. was improved, the development of cracks was suppressed, and the thermal shock resistance was improved.

Example 4

In Sample 31 (rank B) in Example 2, because the $Al_2O_3$ composition in the grain boundary phase was 15 mass % or less, the grain boundary phase containing Y—Al—Si—O was confirmed to be amorphous by powder X-ray diffraction method. By the same set method as Example 2, the same sample was heat-treated by retaining at 1300° C. for 3 hours (Sample 31A) The sample was analyzed variously in the same manner as in Examples 1, 2, and 3. It was confirmed that the z value, the component ratio of the grain boundary phase, the contents of Fe and W, and the type of silicide were identical with that in Sample 31 of Example 2. These results are shown together in Table 4.

TABLE 3

| Sample No. | Grain boundary crystal phase | Fracture toughness value (MPa√m) | | Characteristic at 800° C. | | |
|---|---|---|---|---|---|---|
| | | Room temperature | 800° C. | Strength (MPa) | Thermal conductivity [W/(m·K)] | Thermal shock resistance |
| 28 | melilite | 5.9 | 5.7 | 610 | 17 | B |
| 28A | amorphous | 6.5 | 6.5 | 760 | 15 | A |

As apparent from Table 3, Sample 28A had a higher cooling rate and thus the grain boundary phase was amorphous.

TABLE 4

| Sample No. | Grain boundary crystal phase | Thermal conductivity [W/(m·K)] | | | Strength (MPa) 800° C. | Thermal shock resistance |
|---|---|---|---|---|---|---|
| | | Room temperature | 600° C. | 800° C. | | |
| 31 | amorphous | 27 | 21 | 17 | 720 | B |
| 31A | disilicate apatite | 33 | 25 | 21 | 700 | A |

As apparent from Table 4, in Sample 31A, the grain boundary phase was crystallized by heat treatment, that is, part of the grain boundary phase was crystallized in disilicate phase and apatite phase. It was confirmed that Sample 31A achieved an improvement in thermal conductivity in the range of room temperature to 800° C., and was unsusceptible to cracks, resulting in the improved thermal shock resistance.

silicide were obtained in the manners as described in Example 1. It was confirmed that the obtained results were within the range of the present invention.

These results are shown together in Table 5.

TABLE 5

| | Silicon nitride powder | | Initial sintering conditions | | | | Later term sintering conditions | | | | Characteristic at 800° C. | | |
|---|---|---|---|---|---|---|---|---|---|---|---|---|---|
| Sample No. | Rate of β (%) | z value | Nitrogen partial pressure (kPa) | Temperature (°C.) | Retaining time (hour) | Open porosity (%) | Nitrogen partial pressure (kPa) | Temperature (°C.) | Retaining time (hour) | Relative density (%) | z value of β-sialon after sintering | Strength (MPa) | Thermal conductivity [W/(m·K)] | Thermal shock resistance |
| 32 | 0 | — | 110 | 1750 | 5 | 0 | 500 | 1850 | 5 | 99 | 0.1 | 910 | 21 | A |
| 33 | 3 | 0 | 110 | 1750 | 5 | 1 | 500 | 1850 | 5 | 99 | 0.2 | 880 | 18 | A |
| 34 | 10 | 0 | 110 | 1750 | 5 | 2 | 500 | 1850 | 5 | 99 | 0.5 | 820 | 17 | B |
| 35 | 38 | 0 | 110 | 1750 | 5 | 4 | 500 | 1850 | 5 | 98 | 0.4 | 570 | 16 | C |
| 36 | 10 | 0.5 | 110 | 1750 | 5 | 3 | 500 | 1850 | 5 | 98 | 0.7 | 760 | 10 | B |
| *37 | 10 | 0.8 | 110 | 1750 | 5 | 2 | 500 | 1850 | 5 | 96 | 1.8 | 600 | 7 | D |
| *38 | 10 | 0 | 30 | 1750 | 5 | 10 | 500 | 1850 | 5 | 92 | Many cracks occurred by Si melt | | | |
| 39 | 10 | 0 | 50 | 1750 | 5 | 5 | 500 | 1850 | 5 | 96 | 0.2 | 620 | 14 | C |
| 40 | 10 | 0 | 300 | 1750 | 5 | 3 | 500 | 1850 | 5 | 99 | 0.9 | 790 | 15 | B |
| *41 | 10 | 0 | 500 | 1750 | 5 | 6 | 500 | 1850 | 5 | 99 | 1.7 | 850 | 5 | D |
| 42 | 10 | 0 | 110 | 1800 | 5 | 1 | 500 | 1850 | 5 | 98 | 0.6 | 810 | 16 | A |
| *43 | 10 | 0 | 300 | 1820 | 5 | 2 | 500 | 1850 | 5 | 97 | 1.2 | 760 | 7 | D |
| 44 | 10 | 0 | 110 | 1800 | 3 | 5 | 500 | 1850 | 5 | 99 | 0.4 | 880 | 14 | A |
| *45 | 10 | 0 | 110 | 1750 | 2 | 8 | 500 | 1850 | 5 | 94 | 1.5 | 450 | 6 | D |
| 46 | 10 | 0 | 110 | 1750 | 5 | 2 | 500 | 1820 | 5 | 96 | 0.5 | 590 | 17 | B |
| 47 | 10 | 0 | 110 | 1800 | 5 | 1 | 110 | 1800 | 10 | 97 | 0.6 | 770 | 16 | B |

Sample marked "*" is out of the scope of the present invention.

Example 5

A 8 mass % of $Y_2O_3$ powder, 5 mass % of $Al_2O_3$ powder, 2 mass % of $SiO_2$ powder, 1 mass % of $Fe_2O_3$ powder, and 1 mass % of $WO_3$ powder, each being described in Example 1, and the rest, namely various silicon nitride powders shown in Table 5, were ground and mixed in water by a barrel mill for 60 hours, thereby preparing a mixed powder slurry of $D_{90} \leq 1.5$ μm.

Then, each 2 mass % of PVA and PEO to the powder weight were added and passed through a #600 mesh to remove foreign matters, and this was then deironized by a deironizer, and dried. The dried powder was pressed at a pressure of 1000 kgf/cm² to obtain a metallic mold pressed body of 100 mm square having a thickness of 10 mm.

After the PVA and the PEO were removed from the pressed body in nitrogen of 700° C., this was placed in a sagger made of silicon nitride, and sintered under the initial sintering conditions as shown in Table 5. This was taken out temporarily, and its open porosity was measured by Archimedes' method. Thereafter, this was returned to the sagger and densification was advanced under the later term sintering conditions.

Thermal conductivity at 800° C. (JIS R 1611), four-point flexural strength (JIS R 1601), thermal shock resistance (ΔT=800° C., JIS R 1648 relative method, residual bending strength measurement), and the z value of β-sialon in the sintered body were measured in the manner as described in Example 1.

The component ratios of $Y_2O_3$ and $Al_2O_3$ and $SiO_2$ in the grain boundary phase, the amount of the grain boundary phase, the contents of Fe and W, and the types of Fe and W Referring to Table 5, in Sample 37, the z value of the used silicon nitride powder exceeded 0.5, the z value of β-sialon serving as the principal phase after sintering exceeded 1, and thermal conductivity was lowered thereby to deteriorate thermal shock resistance.

In Sample 38, the nitrogen partial pressure in the initial sintering was lower than 50 kPa, Si was generated by the decomposition of silicon nitride, and many cracks occurred. Sample 41, in which nitrogen partial pressure was controlled to be higher than 300 kPa before starting sintering, was unsusceptible to sintering, and had an open porosity of 5% or more. Further, due to a large supply of N necessary for sialon transformation, the z value of the generated sialon was far above 1, and the thermal conductivity at 800° C. was lowered, resulting in poor thermal shock resistance.

Sample 43, which was placed at a temperature over 1800° C. at the initial stage where open porosity before initiating sintering was large, was susceptible to sialon transformation, the z value exceeded 1, and the thermal conductivity at 800° C. was lowered, resulting in poor thermal shock resistance. Sample 45 was placed in the state where open porosity was larger than 5%, although the nitrogen partial pressure and the temperature in the initial sintering were within the range of the present invention, and under the later term sintering condition where the nitrogen partial pressure exceeded 300 kPa, and the sintering temperature exceeded 1800° C. Therefore, Sample 45 had a low relative density, a z value exceeding 1, and a low strength at 800° C., and a low thermal conductivity at 800° C., resulting in poor thermal shock resistance.

On the other hand, all of Samples 32 to 36, 39, 40, 42, 44, 46, and 47, which were within the range of the present invention, were 500 MPa or more in strength at 800° C., 10 W/(m·K) or more in thermal conductivity at 800° C., and within 30% in strength reduction rate at ΔT=800° C. (at least the rank C in the judgment of thermal shock resistance).

Example 6

Weighing was carried out so as to have 10 mass % of $Y_2O_3$ powder, 4 mass % of $Al_2O_3$ powder, 1 mass % of $Fe_2O_3$ powder, 2 mass % of $WO_3$ powder, and the rest being silicon nitride composition, each being described in Example 1. To prepare the silicon nitride composition, the silicon nitride powder as described in Example 1 (10% in the rate of β phase transformation, $Z \leq 0.1$ when $\beta\text{-}Si_{6-z}Al_zO_zN_{8-z}$, 3 μm in mean particle size $D_{50}$, 200 ppm in Al content, and 0.9 mass % in oxygen content) and metal silicon powder (30 μm in mean particle size $D_{50}$, 300 ppm in Al content, 5000 ppm in Fe content, and 0.7 mass % in oxygen content) were weighed so as to be a weight ratio ($Si/Si_3N_4$) as shown in Table 6.

To a 1 of the total weight of these powders, 1.2 of IPA and 2.5 of silicon nitride media, each being weight ratio, were put in a barrel mill and ground and mixed to prepare a mixed powder slurry of $D_{90} \leq 3.5$ μm. The surface of the silicon nitride powder and the surface of the metal silicon powder were oxidized, and the former and the latter had an oxygen content of 1.8 mass % and 2.1 mass %, respectively (measured by a test where both powders were ground separately under the same condition).

Next, the mixed powder slurry was passed through a #400 mesh to remove foreign matters, and then deionized by a deionizer. Thereafter, each 2 mass % of PVA and PEO to the powder weight were added and granulated by a spray dryer. The mean granule size was about 60 μm. The granules were subject to CIP at a pressure of 800 kgf/cm², and sliced so as to have an outside diameter of 80 mm and a thickness of 10 mm, thereby obtaining a pressed body.

After the PVA and the PEO were removed from the pressed body in a nitrogen air flow of 500° C., this was placed in a sagger made of silicon nitride, and the metal silicon was nitrided. The nitriding condition was as follows. After nitrogen partial pressure was controlled at 800° C. to that shown in Table 6, the pressed body was retained for 6 hours at 1100° C. and 6 hours at 1200° C., and then for 6 hours at the maximum temperature shown in Table 6. After nitriding, this was taken out temporarily, and the nitride body was analyzed. Specifically, by powder X-ray diffraction, the presence and absence of remaining Si was determined, and the rate β phase transformation of the nitride body was calculated. The z value was measured by the method described in Example 1.

Thereafter, this was returned to the sagger and sintered under the sintering conditions as described in Sample 47 in Example 5, thereby obtaining a sintered body. Thermal conductivity at 800° C. (JIS R 1611), four-point flexural strength (JIS R 1601), thermal shock resistance (ΔT=800° C., JIS R 1648 relative method, residual bending strength measurement), and the z value of β-sialon in the sintered body were measured in the manner as described in Example 1.

The component ratios of $Y_2O_3$ and $Al_2O_3$ and $SiO_2$ in the grain boundary phase, the amount of the grain boundary phase, the contents of Fe and W, and the types of Fe and W silicide were obtained in the manners as described in Example 1. It was confirmed that the obtained results were within the range of the present invention.

These results are shown together in Table 6.

TABLE 6

| | | Nitriding condition | | Nitride body | | Sintered body | | Characteristic at 800° C. | | |
| | | Nitrogen | | | | Coefficient of | | | | |
| Sample No. | $Si/Si_3N_4$ weight ratio | partial pressure (kPa) | Maximum temperature (° C.) | Rate of β (%) | z value | sintering (%) | z value | Strength (MPa) | Thermal conductivity [W/(m·K)] | Thermal shock resistance |
|---|---|---|---|---|---|---|---|---|---|---|
| 48 | 1 | 110 | 1250 | 3 | <0.1 | 16 | 0.2 | 800 | 17 | A |
| 49 | 3 | 110 | 1250 | 5 | <0.1 | 15 | 0.3 | 830 | 17 | A |
| 50 | 8 | 110 | 1250 | 10 | 0.1 | 14 | 0.4 | 860 | 16 | A |
| 51 | 10 | 110 | 1250 | 15 | 0.2 | 14 | 0.6 | 650 | 13 | C |
| *52 | 6 | 30 | 1300 | Insufficient nitriding | | | | | | |
| 53 | 6 | 50 | 1300 | 5 | <0.1 | 14 | 0.2 | 880 | 17 | A |
| 54 | 6 | 110 | 1300 | 8 | <0.1 | 14 | 0.3 | 850 | 16 | A |
| 55 | 6 | 500 | 1300 | 27 | 0.3 | 13 | 0.4 | 720 | 12 | B |
| 56 | 6 | 1100 | 1300 | 38 | 0.5 | 14 | 0.6 | 660 | 11 | C |
| *57 | 6 | 2000 | 1300 | Many cracks occurred by temperature excursion | | | | | | |
| 58 | 6 | 110 | 1400 | 10 | 0.2 | 14 | 0.8 | 750 | 10 | C |
| *59 | 6 | 110 | 1500 | 75 | 0.9 | 13 | 1.5 | 330 | 7 | D |

Sample marked '*' is out of the scope of the present invention.

Sample 52, in which the nitrogen partial pressure during nitriding was lower than 50 kPa, had insufficient nitriding and Si remained. Sample 57, in which the nitrogen partial pressure during nitriding was higher than 1.1 MPa, caused exothermic reaction due to a rapid nitriding reaction, and temperature excursion occurred. As a result, Si melt occurred and many cracks observed in the nitride body.

In Sample 59, the maximum temperature during nitriding exceeded 14000° C., the rate of β phase transformation of the nitride body exceeded 40%, and the z value of the nitride body exceeded 0.5. Therefore, the z value of the sintered body was larger than 1, the strength at 800° C. was below 500 MPa, and the thermal conductivity at 800° C. was below 10 W/(m·K), resulting in poor thermal shock resistance.

On the other hand, Samples 48 to 51, 53 to 56, and 58, all of which were within the range of the present invention, had good results. That is, these samples were 500 MPa or more in the thermal conductivity at 800° C., 10 W/(m·K) or more in strength at 800° C., and within 30% in strength reduction rate at ΔT=800° C. (at least the rank C in the judgment of thermal shock resistance).

The invention claimed is:

1. A silicon nitride sintered body comprising β-sialon expressed by a composition formula of $Si_{6-z}Al_zO_zN_{8-z}$, wherein z value being the dissolved amount is 0.1 to 1, as a main phase, a grain boundary phase and Fe silicide particles, wherein the grain boundary phase contains RE (Group III elements in the periodic table)-Al—Si—O, and component ratios of Al, Si and RE in terms of $Al_2O_3$, $SiO_2$, $RE_2O_3$, respectively is 5 to 50 mass % of $Al_2O_3$, 5 to 20 mass % of $SiO_2$, and the balanced amount of $RE_2O_3$, the grain boundary phase is contained in a range of 20 volume % or less to 100 volume % of the sintered body, and the Fe silicide particles is contained in 0.02 to 3 mass % in terms of Fe to 100 mass % of the sintered body.

2. The silicon nitride sintered body according to claim 1, wherein thermal conductivity at 800° C. is 10 W/(m·K) or more, and four-point flexural strength at 800° C. is 500 MPa or more.

3. The silicon nitride sintered body according to claim 1, wherein the RE is Y.

4. The silicon nitride sintered body according to claim 1, wherein W silicide particles is further contained in 0.1 to 5 mass % in terms of W to 100 mass % of the sintered body.

5. The silicon nitride sintered body according to claim 1, wherein the grain boundary phase is amorphous.

6. The silicon nitride sintered body according to claim 1, wherein part of the grain boundary phase is crystallized in at least one selected from borastenito phase, apatite phase, disilicate phase, and monosilicate phase.

7. A method of manufacturing a silicon nitride sintered body as set forth in claim 1, comprising the steps of:

preparing a mixture by mixing silicon nitride powder having a rate of β phase transformation of 40% or less, wherein, when a composition formula is $Si_{6-z}Al_zO_zN_{8-z}$, z value being the dissolved amount is 0.5 or less, together with $RE_2O_3$ powder, $Al_2O_3$ powder, and $Fe_2O_3$ powder, each being additive ingredient; and sintering a formed body obtained by forming the mixture, at a nitrogen partial pressure of 50 to 300 kPa and a temperature of 1800° C. or less until open porosity is 5% or less, followed by densification until relative density is 96% or more.

8. A method of manufacturing a silicon nitride sintered body as set forth in claim 1, comprising the steps of:

preparing a mixture by mixing silicon nitride powder having a rate of β phase transformation of 40% or less, wherein, when a composition formula is $Si_{6-z}Al_zO_zN_{8-z}$, z value being the dissolved amount is 0.5 or less, together with metal silicon powder so that weight ratio [(metal silicon powder)/(silicon nitride powder)] is 1 to 10, and further mixing $Y_2O_3$ powder, $Al_2O_3$ powder, and $Fe_2O_3$ powder, each being additive ingredient;

preparing a porous nitride body where the metal silicon powder is converted to silicon nitride, by sintering a formed body obtained by forming the mixture, at a nitrogen partial pressure of 50 kPa to 1.1 MPa and in a temperature range of 1000 to 1400° C.; and sintering the porous nitride body at a nitrogen partial pressure of 50 to 300 kPa and a temperature of 1800° C. or less until open porosity is 5% or less, followed by densification until relative density is 96% or more.

9. The method of manufacturing a silicon nitride sintered body according to claim 8, wherein a silicon nitride part of the porous nitride body has a rate of β phase transformation of 40% or less, and a z value of 0.5 or less.

10. The method of manufacturing a silicon nitride sintered body according to claim 7 or 8, wherein $WO_3$ powder is further added and mixed as an additive ingredient.

11. A member for molten metal comprising a silicon nitride sintered body as set forth in claim 1.

12. A member for hot working comprising a silicon nitride sintered body as set forth in claim 1.

13. A member for digging comprising a silicon nitride sintered body as set forth in claim 1.

* * * * *